United States Patent
Zanoni et al.

(10) Patent No.: US 9,843,398 B1
(45) Date of Patent: Dec. 12, 2017

(54) PHOTONIC DIRECT SAMPLING DIGITAL RECEIVER

(71) Applicant: Rockwell Collins, Inc., Cedar Rapids, IA (US)

(72) Inventors: Raymond Zanoni, Columbia, MD (US); Jerzy K. Richter, Cedar Rapids, IA (US); Altin E. Pelteku, Severna Park, MD (US); Oliver S. King, Frederick, MD (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 15/161,052

(22) Filed: May 20, 2016

(51) Int. Cl.
*H04B 10/00* (2013.01)
*H04B 10/61* (2013.01)
*H04B 1/00* (2006.01)

(52) U.S. Cl.
CPC ......... *H04B 10/612* (2013.01); *H04B 1/0007* (2013.01)

(58) Field of Classification Search
USPC .......................................................... 398/115
See application file for complete search history.

(56) References Cited

U.S. PATENT DOCUMENTS

| | | | | |
|---|---|---|---|---|
| 4,058,722 A | * | 11/1977 | Taylor | G02F 7/00 250/225 |
| 4,325,603 A | * | 4/1982 | Marom | G02F 7/00 341/137 |
| 4,502,037 A | * | 2/1985 | Le Parquier | G02F 7/00 341/111 |
| 4,947,170 A | * | 8/1990 | Falk | G02F 7/00 341/137 |
| 4,991,920 A | * | 2/1991 | Peczalski | G02F 7/00 341/137 |
| 5,010,346 A | * | 4/1991 | Hamilton | G02F 7/00 250/227.12 |
| 5,955,875 A | * | 9/1999 | Twichell | G11C 13/047 324/96 |
| 6,028,424 A | * | 2/2000 | Twichell | G11C 13/047 324/754.23 |
| 6,064,325 A | * | 5/2000 | Fields | G02F 7/00 341/137 |
| 6,100,831 A | * | 8/2000 | Frankel | G02F 7/00 341/137 |

(Continued)

*Primary Examiner* — Agustin Bello
(74) *Attorney, Agent, or Firm* — Donna Suchy; Daniel M. Barbieri

(57) ABSTRACT

A photonic analog to digital converter (pADC) includes an electronic I/Q generator, an optical sampler, and an optical detector. The electronic I/Q generator is configured to receive an RF signal and to generate an electronic in-phase signal I and an electronic quadrature-phase signal Q based on the received RF signal. The optical sampler includes one or more optical intensity modulators configured to receive the electronic I and Q signals from the electronic I/Q generator, and to modulate optical pulses to provide modulated optical I and Q signals based on the received electronic I and Q signals from the electronic I/Q generator. The optical detector includes a plurality of photodetectors, and is arranged to receive the modulated optical I and Q signals from the optical sampler and to convert the modulated optical I and Q signals into modulated electronic I and Q signals.

18 Claims, 2 Drawing Sheets

(56) References Cited

U.S. PATENT DOCUMENTS

| | | | |
|---|---|---|---|
| 6,118,396 A * | 9/2000 | Song | H03M 1/1215 250/200 |
| 6,118,397 A * | 9/2000 | Heflinger | G02F 7/00 341/137 |
| 6,160,504 A * | 12/2000 | Fields | G02F 7/00 341/126 |
| 6,175,320 B1 * | 1/2001 | Heflinger | G02F 7/00 341/131 |
| 6,188,342 B1 * | 2/2001 | Gallo | H03M 1/368 341/137 |
| 6,246,350 B1 * | 6/2001 | Yap | H03M 1/361 324/96 |
| 6,326,910 B1 * | 12/2001 | Hayduk | G02F 7/00 341/137 |
| 6,404,366 B1 * | 6/2002 | Clark | G02F 7/00 341/137 |
| 6,420,985 B1 * | 7/2002 | Toughlian | H03M 1/368 341/137 |
| 6,433,715 B2 * | 8/2002 | Prucnal | H04L 7/0075 341/137 |
| 6,469,649 B1 * | 10/2002 | Helkey | G02F 7/00 341/143 |
| 6,525,682 B2 * | 2/2003 | Yap | G02F 7/00 341/137 |
| 6,529,150 B1 * | 3/2003 | Shoop | H03M 3/468 341/13 |
| 6,661,361 B1 * | 12/2003 | Lewis | G01J 9/0246 341/137 |
| 6,700,517 B1 * | 3/2004 | Kellar | G02F 7/00 341/126 |
| 7,212,140 B2 * | 5/2007 | Soderberg | B82Y 20/00 341/137 |
| 7,403,142 B2 * | 7/2008 | Hirono | G02F 7/00 341/137 |
| 7,403,143 B2 * | 7/2008 | Hirono | G02F 7/00 341/13 |
| 7,570,184 B2 * | 8/2009 | Ikeda | H03M 1/122 341/137 |
| 7,671,771 B2 * | 3/2010 | Hirono | G02F 7/00 341/137 |
| 7,826,752 B1 * | 11/2010 | Zanoni | H04B 10/5055 398/186 |
| 7,956,788 B2 * | 6/2011 | Lee | G02F 7/00 341/137 |
| 7,973,688 B2 * | 7/2011 | Huang | G02F 7/00 341/118 |
| 7,990,299 B2 * | 8/2011 | Bell | H03M 1/64 341/137 |
| 8,009,995 B2 * | 8/2011 | Marc | G02F 7/00 341/137 |
| 8,026,837 B1 * | 9/2011 | Valley | H04B 10/676 341/137 |
| 8,442,402 B1 * | 5/2013 | Zanoni | H03M 1/1245 341/137 |
| 8,446,305 B1 * | 5/2013 | Zanoni | H03M 1/124 341/137 |
| 8,779,955 B1 * | 7/2014 | Zanoni | G02F 7/00 341/132 |
| 8,860,608 B2 * | 10/2014 | Pierno | G01S 13/02 342/195 |
| 8,922,410 B2 * | 12/2014 | Sudo | G02F 1/3517 341/137 |
| 8,953,950 B2 * | 2/2015 | Nazarathy | H03M 1/145 398/188 |
| 8,965,211 B1 * | 2/2015 | Zanoni | H04B 10/61 341/137 |
| 9,052,534 B2 * | 6/2015 | Sudo | G02F 2/00 |
| 9,118,423 B1 * | 8/2015 | Zanoni | H04B 10/00 |
| 9,197,471 B1 * | 11/2015 | Zanoni | H04L 27/223 |
| 9,356,704 B1 * | 5/2016 | Zanoni | H04B 10/61 |
| 2007/0159369 A1 * | 7/2007 | Currie | H03M 1/74 341/144 |
| 2010/0054743 A1 * | 3/2010 | Heaton | H03M 1/121 398/91 |
| 2012/0213531 A1 * | 8/2012 | Nazarathy | H03M 1/145 398/202 |
| 2013/0016004 A1 * | 1/2013 | Pierno | G01S 13/02 342/195 |

* cited by examiner

PHOTONIC DIRECT SAMPLING DIGITAL RECEIVER

The inventive concepts disclosed herein generally relate to the field of Analog-to-Digital Converters.

BACKGROUND

Military RF systems conventionally include wide bandwidth, high resolution Analog-to-Digital Converters (ADC) to enable, for example, wideband staring Signals Intelligence (SIGINT) receivers, flexible Software Defined Radio system architectures, and Low Probability of Intercept/Low Probability of Detection (LPI/LPD) radars. These systems often use electronic ADC (eADC) components.

Analog-to-Digital Converters (ADC) using optical or photonic ADCs (pADCs) are also known. For example, U.S. Pat. No. 8,446,305 entitled "PHOTONIC ANALOG TO DIGITAL CONVERSION" uses pADCs in its design. Typically in such pADC systems the IQ demodulator is photonic and a single phase modulator is used. The pADC samples an RF signal with a stream of optical pulses emitted by an optical pulse source.

A reference signal and the phase modulated signal are provided as optical signals to an optical IQ demodulator of the pADC. The optical IQ demodulator optically demodulates the reference signal and the phase modulated signal to provide optically demodulated in-phase (I) and quadrature-phase (Q) signals. The optically demodulated I and Q signals are then sent to, and detected by, photodetectors, the electronic signals thereof are applied to a digitizer platform.

The pADC with a single phase modulator and the optical IQ demodulator has problems, however. The single phase modulator used in such signal/reference architecture has a relatively increased maximum modulator drive voltage. This increases the power consumption of the modulator drive circuit. In addition, the optical IQ demodulator adds to the optical propagation loss. Increased optical loss leads to increased required optical pulse power, and hence, electrical power dissipation. Further IQ imbalance is not tuned in the electrical domain.

SUMMARY

In one aspect, embodiments of the inventive concepts disclosed herein are directed to a photonic analog to digital converter (pADC) which includes an electronic I/Q generator configured to receive an RF signal and to generate an electronic in-phase signal I and an electronic quadrature-phase signal Q based on the received RF signal. An optical sampler includes one or more optical intensity modulators and is configured to receive the electronic I and Q signals from the electronic I/Q generator, and to modulate optical pulses to provide modulated optical I and Q signals based on the received electronic I and Q signals from the electronic I/Q generator. An optical detector includes photodetectors arranged to receive the modulated optical I and Q signals from the optical sampler and to convert the modulated optical I and Q signals into modulated electronic I and Q signals.

In a further aspect, embodiments of the inventive concepts disclosed herein are directed to a processing system, which includes a photonic analog to digital converter (pADC). In turn, the pADC includes an electronic I/Q generator configured to receive an RF signal and to generate an electronic in-phase signal I and an electronic quadrature-phase signal Q based on the received RF signal. An optical sampler includes one or more optical intensity modulators configured to receive the electronic I and Q signals from the electronic I/Q generator, and to modulate optical pulses to provide modulated optical I and Q signals based on the received electronic I and Q signals from the electronic I/Q generator. An optical detector includes photodetectors arranged to receive the modulated optical I and Q signals from the optical sampler and to convert the modulated optical I and Q signals into modulated electronic I and Q signals. An opto-electronic receiver and quantizer is configured to receive the modulated electronic I and Q signals from the optical detector, and to quantize the modulated electronic I and Q signals from the optical detector. The processing system further includes processing electronics configured to receive the quantized I and Q signals from the pADC and to provide further signal processing on the quantized I and Q signals.

In a further aspect, embodiments of inventive concepts disclosed herein are directed to a method of photonic analog to digital conversion. The method includes receiving an RF signal, generating an electronic in-phase signal I and an electronic quadrature-phase signal Q based on the received RF signal, modulating optical pulses to provide modulated optical I and Q signals based on the generated electronic I and Q signals, and converting the modulated optical I and Q signals into modulated electronic I and Q signals.

DETAILED DESCRIPTION

According to inventive concepts disclosed herein, a pADC is described wherein an electronic I/Q generator is disposed to generate the I and Q signals prior to optical sampling, instead of an IQ demodulator disposed after optical sampling. This simplified architecture provides several advantages. By replacing the single phase modulator used in prior systems with two intensity modulators in the differential configuration disclosed here, the maximum modulator drive voltage is reduced by a factor of 2. This reduces the power consumption of the modulator drive circuit. In addition, the optical IQ demodulator is eliminated, thereby reducing the optical propagation loss. Reduced optical loss leads to reduced required optical pulse power, and hence, electrical power dissipation. Further any IQ imbalance can be tuned in the electrical domain using the electronic I/Q generator. These aspects of the pADC provide advantages of reduced power consumption when the pADC is incorporated into systems such as radar systems, and RF systems, discussed above, including wide bandwidth, high resolution ADC to enable, for example, wideband staring SIGINT receivers, flexible Software Defined Radio system architectures, and LPI/LPD radars, According to inventive concepts disclosed herein, a pADC is described wherein an electronic I/Q generator is disposed to generate the I and Q signals prior to optical sampling, instead of an IQ demodulator disposed after optical sampling. Further, the pADC employs a pair of intensity modulators instead of a single phase modulator.

Figure 1:
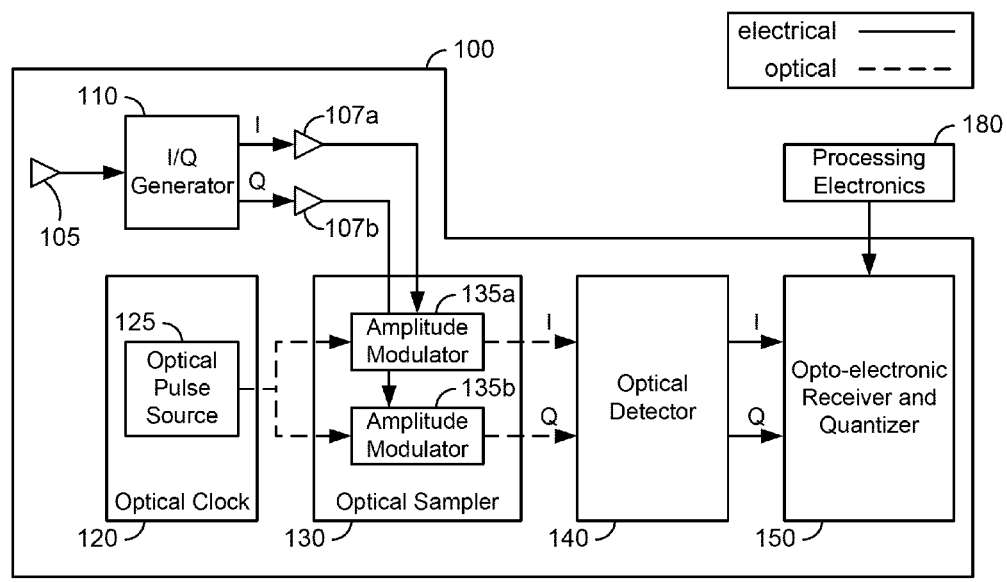
FIG. 1 is a schematic of an exemplary embodiment of a pADC according to the inventive concepts disclosed herein.

FIG. 1 illustrates an exemplary embodiment of a pADC 100 according to inventive concepts disclosed herein. The pADC 100 includes an electronic I/Q generator 110, an optical clock 120, an optical sampler 130, an optical detector 140, and an opto-electronic receiver and quantizer 150. The pADC 100 may further be part of a processing system includes the pADC 100 and processing electronics 180. The processing electronics 180 receives the quantized I and Q signals from the pADC 100 and provides further signal processing as desired on the quantized I and Q signals. The processing electronics 180 may be, for example, a field-programmable gate array (FPGA), or other electronics, for further processing or for transmittal to another electronics system.

The electronic I/Q generator 110 receives an RF signal 105, and generates an electronic in-phase signal I and an electronic quadrature-phase signal Q based on the RF signal. Thus, the I/Q generator 110 provides electronic signals instead of optical. Amplifiers 107a and 107b amplify the generated electronic I and Q signals, respectively, and provide the amplified electronic I and Q signals to the optical sampler 130.

The optical clock 120 may include an optical pulse source 125. The optical pulse source 125 may include a mode locked laser and oscillator (MLL/OSC), for example, which provides optical pulses. The pADC 100 samples the electronic signals I and Q received from the amplifiers 107a and 107b with a stream of optical pulses emitted by the optical pulse source 120. In parallel, the optical pulses are modulated in the sampler 130 by electronic signals I and Q received from the amplifiers 107a and 107b. The sampler 130 includes an optical intensity modulator 135a and an optical intensity modulator 135b. The optical pulses are modulated by the optical intensity modulator 135a of the sampler 130 by electronic signal I to provide a modulated optical I signal, and similarly the optical pulses are modulated by the optical intensity modulator 135b of the sampler 130 by electronic signal Q to provide a modulated optical Q signal.

Figure 2:
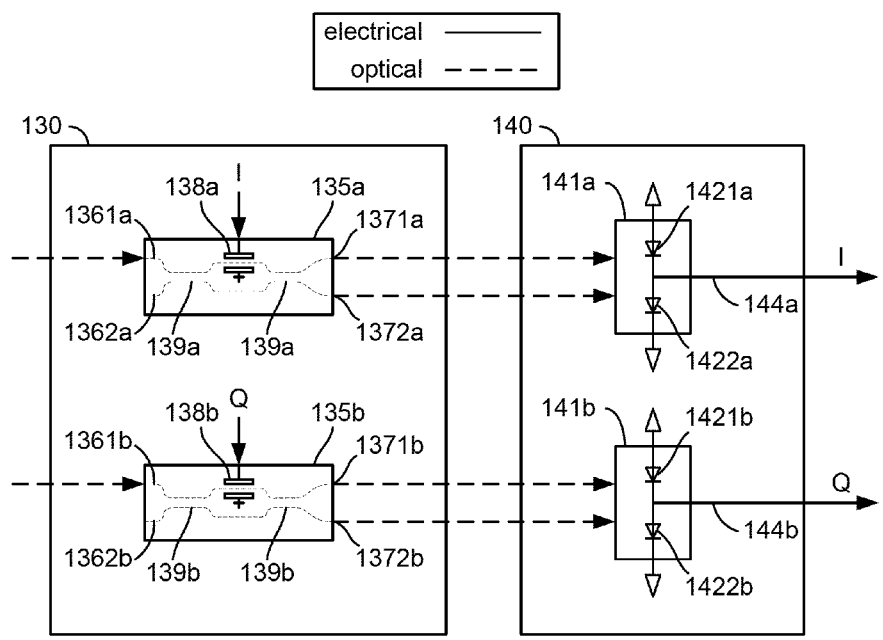
FIG. 2 is a detailed schematic of an optical sampler and an optical detector of the pADC of FIG. 1.

FIG. 2 illustrates further details of the optical intensity modulators 135a and 135b and the optical detector 140 in a balanced photodetector arrangement. The optical intensity modulator 135a for the I signal may include a mach-zehnder modulator as shown in FIG. 2 with two optical paths 1361a and 1362a. An optical pulse from the optical pulse source 120 (see FIG. 1) is input to the optical intensity modulator via the optical path 1361a. The optical paths 1361a and 1362a have two coupler regions 139a, where optical paths 1361a and 1362a come in close proximity to each other.

The electronic signal I is input to the optical intensity modulator 135a via the electrode 138a to apply a voltage across the optical path 1361a, and thus to modulate the intensity of the optical pulse and to provide a modulated optical I signal. The optical path 1361a of the mach-zehnder modulator has an optical output 1371a, and the optical path 1362a of the mach-zehnder modulator has an optical output 1372a, where the modulated optical signal at the optical output 1371a is 180° out of phase with the modulated optical signal at the optical output 1372a.

The intensity modulated output from the optical output 1371a and the optical output 1372a are provided to a balanced photodetector unit 141a having the balanced photodetectors 1421a and 1422a, respectively, of the optical detector 140. The photodetectors 1421a and 1422a may comprise photodiodes, for example. The photodetectors 1421a and 1422a may be arranged as differential detectors as shown in FIG. 2. In this case, because the modulated optical signal at the optical output 1371a is 180° out of phase with the modulated optical signal at the optical output 1372a, the differential detector configuration doubles the modulated electronic signal output from the photodetectors 1421a and 1422a at photodetector output 144a.

Further, with the differential detector configuration, the common mode component from the photodetectors 1421a and 1422a is cancelled. Thus, common mode noise such as Relative Intensity Noise (RIN) from the optical pulse source may be significantly reduced or eliminated.

The optical intensity modulator 135b for the Q signal and the corresponding balanced photodetectors have a similar arrangement as the optical intensity modulator 135a for the I signal and the corresponding balanced photodetectors, as follows. The optical intensity modulator 135b for the Q signal may include a mach-zehnder modulator as shown in FIG. 2 with two optical paths 1361b and 1362b. An optical pulse from the optical pulse source 120 (see FIG. 1) is input to the optical intensity modulator via the optical path 1361b. The optical paths 1361b and 1362b have two coupler regions 139b, where optical paths 1361b and 1362b come in close proximity to each other.

The electronic signal Q is input to the optical intensity modulator 135b via the electrode 138b to apply a voltage across the optical path 1361b, and thus to modulate the intensity of the optical pulse and to provide a modulated optical Q signal. The optical path 136b1 of the mach-zehnder modulator has an optical output 1371b, and the optical path 1362b of the mach-zehnder modulator has an optical output 1372b, where the modulated optical signal at the optical output 1371b is 180° out of phase with the modulated optical signal at the optical output 1372b.

The intensity modulated optical output from the optical output 1371b and the intensity modulated optical output 1372b are provided to a balance photodetector unit 141b having the balanced photodetectors 1421b and 1422b, respectively, of the optical detector 140. The photodetectors 1421b and 1422b may be arranged as differential detectors as shown in FIG. 2. In this case, because the modulated optical signal at the optical output 1371b is 180° out of phase with the modulated optical signal at the optical output 1372b, the differential detector configuration doubles the electronic signal output from the photodetectors 1421b and 1422b at the photodetector output 144b.

The photodetector outputs 144a and 144b, respectively, provide the modulated I and Q electronic signals to the opto-electronic receiver and quantizer 150.

Figure 3:
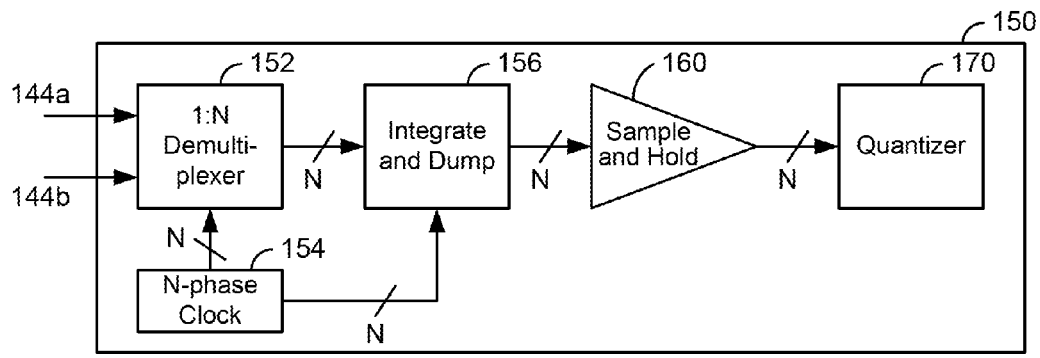
FIG. 3 is a schematic illustrating an opto-electronic receiver and quantizer of the pADC of FIG. 1.

The opto-electronic receiver and quantizer 150 receives modulated electronic signals from the photodetector outputs 144a and 144b and processes and quantizes the received modulated electronic signals. The opto-electronic receiver and quantizer 150 is shown in more detail in FIG. 3, although other configurations are also contemplated. The opto-electronic receiver and quantizer 150 includes a 1:N demultiplexor 152 which demultiplexes the received modulated electronic signals based upon a N-Phase Clock 154 of the opto-electronic receiver and quantizer 150, where N is an integer. The demultiplexed signal from the 1:N demultiplexor 152 is provided to an integrate and dump circuit 156 of the opto-electronic receiver and quantizer 150. The integrate and dump circuit 156 integrates the signal received over a period of time, and then provides an integrated value as an output. The integrate and dump circuit 156 provides an input value to buffer amplifiers 158 of the opto-electronic receiver and quantizer 150, where in turn the buffer amplifiers 158 provide an input value to sample and hold circuits 160. A quantizer 170 of the opto-electronic receiver and quantizer 150 receives the output from the sample and hold circuits 160 and quantizes the received values to provide quantized I and Q signals. The quantized I and Q signals may be transferred to further electronics for processing.

Figure 4:
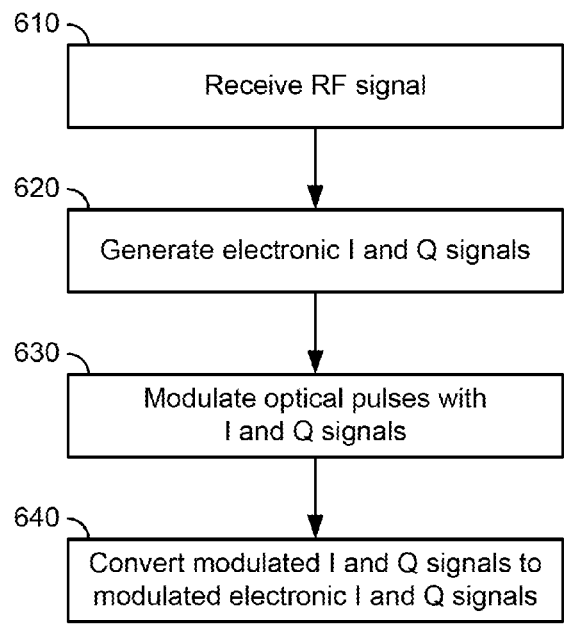
FIG. 4 is a flow chart illustrating a method according to the inventive concepts disclosed herein.

FIG. 4 illustrates a flow chart describing a method of photonic analog to digital conversion, such as by using the pADC of FIG. 1. In step 610 an RF signal is received by the electronic I/Q generator 110. In step 620 and an electronic in-phase signal and an electronic quadrature-phase signal is generated by the electronic I/Q generator 110. For example, the electronic I/Q generator 110 may generate an electronic in-phase signal I and an electronic quadrature-phase signal Q based on the received RF signal. In step 630 optical pulses are modulated. For example, the optical sampler 130 may modulate optical pulses to provide modulated optical I and Q signals based on the generated electronic I and Q signals. The optical I signals may be modulated via a first optical intensity modulator, and the optical Q signals may be modulated via a second optical intensity modulator different from the first optical intensity modulator. In step 640, the modulated optical I and Q signals are converted into modulated electronic I and Q signals. For example, the optical detector 140 may convert the modulated optical I and Q signals into modulated electronic I and Q signals.

What is claimed is:

1. A photonic analog to digital converter (pADC), comprising:
   an electronic I/Q generator configured to receive an RF signal and to generate an electronic in-phase signal I and an electronic quadrature-phase signal Q based on the received RF signal;
   an optical sampler, coupled to the electronic I/Q generator, and including a plurality of optical intensity modulators, the plurality of optical intensity modulators being amplitude modulators, configured to receive the electronic I and Q signals from the electronic I/Q generator, to modulate optical pulses to provide modulated optical I and Q signals based on the received electronic I and Q signals from the electronic I/Q generator, the plurality of optical intensity modulators comprising a first optical intensity modulator configured to receive electronic I signals from the electronic I/Q generator, to modulate optical pulses to provide modulated optical I signals based on the received electronic I signals from the electronic I/Q generator, and a second optical intensity modulator configured to receive electronic Q signals from the electronic I/Q generator, to modulate optical pulses to provide modulated optical Q signals based on the received electronic Q signals from the electronic I/Q generator and
   an optical detector, coupled to the optical sampler, and comprising a plurality of photodetectors, arranged to receive the modulated optical I and Q signals from the optical sampler and to convert the modulated optical I and Q signals into modulated electronic I and Q signals.

2. The pADC of claim 1, further comprising:
   an optical clock comprising an optical pulse source, configured to provide the optical pulses to the optical sampler.

3. The pADC of claim 1, wherein the optical pulse source comprises a mode locked laser and oscillator.

4. The pADC of claim 1, wherein each of the first and second optical intensity modulators comprises a mach-zehnder modulator.

5. The pADC of claim 1, wherein the plurality of photodetectors comprise:
   a first pair of photodetectors arranged in a balanced arrangement to receive a pair of modulated optical I signals from the optical sampler and to provide a single electronic I signal based on the pair of modulated optical I signals, and
   a second pair of photodetectors arranged in a balanced arrangement to receive a pair of modulated optical Q signals from the optical sampler and to provide a single electronic Q signal based on the pair of modulated optical Q signals.

6. The pADC of claim 5, wherein each of the first pair of photodetectors and the second pair of photodetectors are arranged as differential photodetectors.

7. The pADC of claim 6, wherein the photodetectors comprise photodiodes.

8. The pADC of claim 5, wherein the pair of modulated optical I signals are 180° out of phase with each other and the pair of modulated optical Q signals are 180° out of phase with each other.

9. The pADC of claim 5, wherein each of the first and second optical intensity modulators comprises a mach-zehnder modulator.

10. The pADC of claim 9, wherein the pair of modulated optical I signals are 180° out of phase with each other and the pair of modulated optical Q signals are 180° out of phase with each other.

11. The pADC of claim 1, further comprising:
    an opto-electronic receiver and quantizer configured to receive the modulated electronic I and Q signals from the optical detector, and to quantize the modulated electronic I and Q signals from the optical detector received from the opto-electronic receiver and quantizer.

12. The pADC of claim 1, further comprising amplifiers configured to amplify the electronic I and Q signals from the electronic I/Q generator.

13. A processing system comprising:
    a photonic analog to digital converter (pADC), comprising:
       an electronic I/Q generator configured to receive an RF signal and to generate an electronic in-phase signal I and an electronic quadrature-phase signal Q based on the received RF signal;
       an optical sampler, coupled to the electronic I/Q generator, including a plurality of optical intensity modulators, the plurality of optical intensity modulators being amplitude modulators, configured to receive the electronic I and Q signals from the electronic I/Q generator, to modulate optical pulses to provide modulated optical I and Q signals based on the received electronic I and Q signals from the electronic I/Q generator, the plurality of optical intensity modulators comprising a first optical intensity modulator configured to receive electronic I signals from the electronic I/Q generator, to modulate optical pulses to provide modulated optical I signals based on the received electronic I signals from the electronic I/Q generator, and a second optical intensity modulator configured to receive electronic Q signals from the electronic I/Q generator, to modulate optical pulses to provide modulated optical Q signals based on the received electronic Q signals from the electronic I/Q generator;
       an optical detector, coupled to the optical sampler, and comprising a plurality of photodetectors, arranged to receive the modulated optical I and Q signals from the optical sampler and to convert the modulated optical I and Q signals into modulated electronic I and Q signals; and an opto-electronic receiver and quantizer, coupled to the optical detector, and configured to receive the modulated electronic I and Q signals from the optical detector, and to quantize the modulated electronic I and Q signals from the optical detector received from the opto-electronic receiver and quantizer; and processing electronics, coupled to the opto-electronic receiver and quantizer, and configured to receive the quantized I and Q signals from the pADC and to provide further signal processing on the quantized I and Q signals.

14. The pADC of claim 13, wherein each of the first and second optical intensity modulators comprises a mach-zehnder modulator.

15. The pADC of claim 13, wherein the plurality of photodetectors comprise:
   a first pair of photodetectors arranged in a balanced arrangement to receive a pair of modulated optical I signals from the optical sampler and to provide a single electronic I signal based on the pair of modulated optical I signals, and
   a second pair of photodetectors arranged in a balanced arrangement to receive a pair of modulated optical Q signals from the optical sampler and to provide a single electronic Q signal based on the pair of modulated optical Q signals.

16. A method of photonic analog to digital conversion, comprising:
   receiving an RF signal;
   generating an electronic in-phase signal I and an electronic quadrature-phase signal Q based on the received RF signal;
   amplitude modulating the optical I signals to provide modulated optical I signals based on the generated electronic I signals;
   amplitude modulating the optical Q signals to provide modulated optical Q signals based on the generated electronic Q signals; and
   converting the modulated optical I and Q signals into modulated electronic I and Q signals.

17. The method of claim 16, wherein each of the first and second optical intensity modulators comprises a mach-zehnder modulator.

18. The method of claim 16, wherein the converting the modulated optical I and Q signals into modulated electronic I and Q signals is performed using balanced photodetector pairs.

* * * * *